Patented Sept. 11, 1923.

1,467,733

UNITED STATES PATENT OFFICE.

EMIL LÜSCHER AND THEODOR LICHTENHAHN, OF BASEL, SWITZERLAND, ASSIGNORS TO ELEKTRIZITATSWERK LONZA, OF GAMPEL AND BASEL, SWITZERLAND.

MANUFACTURE OF METALDEHYDE.

No Drawing. Original application filed August 8, 1922, Serial No. 580,540. Divided and this application filed April 10, 1923. Serial No. 631,221.

*To all whom it may concern:*

Be it known that we, EMIL LÜSCHER, a citizen of the Swiss Republic, and resident of Blauensteinerstrasse 8, Basel, Switzerland, and THEODOR LICHTENHAHN, a citizen of the Swiss Republic, and resident of Sommergasse 2, Basel, Switzerland, have invented new and useful Improvements in the Manufacture of Metaldehyde, of which the following is a full, clear, and exact description.

This is a divisional application of our application for Letters Patent filed August 8, 1922, Ser. No. 580,540.

Metaldehyde is produced when catalyzers are allowed to act on acetaldehyde at temperatures below 10° centigrade, preferably at zero centigrade, or lower. According to the literature (see, for example, Beilstein's "Handbuch der organischen Chemie," third edition, volume 1, page 917) acids, and also calcium chloride in lumps, constitute such catalyzers. At the same time, and indeed primarily, the acids are paraldehyde catalyzers, their action on acetaldehyde yielding mainly paraldehyde, together with metaldehyde in but small quantities.

Even at low temperatures, the final equilibrium between the three polymers, acetaldehyde, paraldehyde and metaldehyde, inclines so far in favour of paraldehyde that the final liquid contains over 90 per cent of paraldehyde with acetaldehyde, and with a quantity of metaldehyde so small that it remains in solution. It is only for a limited period during the transformation that the metaldehyde is obtained to such an amount as to exceed the limit of its solubility in the mixture and appear in the solid form but disappearing again, as the action continues. This period must be utilized to separate it from the liquid and withdraw it from the influence of the catalyzer. Even then, according to existing publications, not more than 1.8 grammes of metaldehyde can be recovered from 100 grammes of acetaldehyde, which is too small an amount to make the process commercially available.

The problem has therefore been to find what catalyzers will accelerate the production of metaldehyde more rapidly relatively to the production of paraldehyde, and to a greater extent than is effected when using the catalyzers hitherto employed and especially the acids which have up to now almost exclusively been used as catalyzers.

We have found that small quantities of metal haloids employed in conjunction with small quantities of acid substances possess the required property. For instance a quiet and regular transformation of the acetaldehyde into metaldehyde takes place, when a small quantity of acid (for example hydrobromic or hydrochloric acid) is added to the liquid acetaldehyde in addition to a small quantity of the haloid salt (lithium bromide, calcium chloride, calcium bromide, magnesium chloride, cerium chloride, thorium chloride, titanium chloride, etc.) employed. Thereby the acid activates the haloid salt in such a way that its metaldehyde-forming action is not overpowered by the paraldehyde-forming action of the acid, but that the sluggishness of the action of the haloid salt is overcome. A similar effect is, of course, obtainable, by replacing the acids by acid salts and by substances (such as ferric chloride, aluminium chloride, sulfur haloids) which, in consequence of their aldehydolysis, exhibit acid properties when dissolved in acetaldehyde or paraldehyde.

In all cases the addition of the acid substance to the metal haloid accelerates the formation of metaldehyde to such an extent that the limits of solubility of metaldehyde in the liquid are quickly exceeded, and the metaldehyde precipitated in solid form and recovered in comparatively large quantities.

All the catalyzers employed as aforesaid give the maximum yield when the temperature of the reaction liquid is maintained below 10° centigrade during the process.

The following is an example of how this invention can be performed.

Acetaldehyde, cooled down to about zero centigrade, is treated according to this invention with a few hundredths of one per cent of a catalyzer of the character aforesaid, for instance of a catalyzer formed by 1 molecular proportion of a metalhaloid and $\frac{1}{10}$ molecular proportion of an inorganic acid. A crystalline deposit, consisting of metaldehyde, quickly forms and is obtained by filtering. The filtrate consists mainly of paraldehyde and can be transformed again to acetaldehyde by the action of catalyzers at higher temperatures.

Under identical conditions, the use of pure calcium chloride will yield no metaldehyde, the use of sulfuric acid will give a yield of from 1.5 to 1.8 per cent, whilst the use of calcium bromide with the addition of a little hydrobromic acid will give a yield of 8.4 per cent and the use of calcium chloride with the addition of a little hydrochloric acid will give a yield of 6 per cent of metaldehyde.

What we claim as our invention and desire to secure by patent is:

1. An improvement in the manufacture of metaldehyde from acetaldehyde consisting in the employment as catalyst of a small quantity of metal haloid in conjunction with a small quantity of an acid substance.

2. An improvement in the manufacture of metaldehyde from acetaldehyde consisting in the employment as catalyst of a small quantity of a haloid of an alkali-earth metal in conjunction with a small quantity of an acid substance.

3. An improvement in the manufacture of metaldehyde from acetaldehyde consisting in the employment as catalyst of a small quantity of a calcium haloid in conjunction with a small quantity of an acid substance.

4. An improvement in the manufacture of metaldehyde from acetaldehyde consisting in the employment as catalyst of a small quantity of calcium bromide in conjunction with a small quantity of an acid substance.

5. An improvement in the manufacture of metaldehyde from acetaldehyde consisting in the employment as catalyst of a small quantity of a metal haloid in conjunction with a small quantity of an acid.

6. An improvement in the manufacture of metaldehyde from acetaldehyde consisting in the employment as catalyst of a small quantity of a haloid of an alkali-earth metal in conjunction with a small quantity of an acid.

7. An improvement in the manufacture of metaldehyde from acetaldehyde, consisting in the employment as catalyst of a small quantity of a calcium haloid in conjunction with a small quantity of an acid.

8. An improvement in the manufacture of metaldehyde from acetaldehyde consisting in the employment as catalyst of a small quantity of calcium bromide in conjunction with a small quantity of an acid.

9. An improvement in the manufacture of metaldehyde from acetaldehyde consisting in the employment as catalyst of a metal haloid in conjunction with a small quantity of an inorganic acid.

10. An improvement in the manufacture of metaldehyde from acetaldehyde consisting in the employment as catalyst of a small quantity of a haloid of an alkali-earth metal in conjunction with a small quantity of an inorganic acid.

11. An improvement in the manufacture of metaldehyde from acetaldehyde consisting in the employment as catalyst of a small quantity of calcium haloid in conjunction with a small quantity of an inorganic acid.

12. An improvement in the manufacture of metaldehyde from acetaldehyde consisting in the employment as catalyst of a small quantity of calcium bromide in conjunction with a small quantity of an inorganic acid.

13. An improvement in the manufacture of metaldehyde from acetaldehyde consisting in the employment as catalyst of a small quantity of a metal haloid in conjunction with a small quantity of hydrochloric acid.

14. An improvement in the manufacture of metaldehyde from acetaldehyde consisting in the employment as catalyst of a small quantity of a haloid of an alkali-earth metal in conjunction with a small quantity of hydrochloric acid.

15. An improvement in the manufacture of metaldehyde from acetaldehyde consisting in the employment as catalyst of a small quantity of a calcium haloid in conjunction with a small quantity of hydrochloric acid.

16. An improvement in the manufacture of metaldehyde from acetaldehyde consisting in the employment as catalyst of a small quantity of calcium bromide in conjunction with a small quantity of hydrochloric acid.

In witness whereof we have hereunto signed our names this 26th day of March, 1923, in the presence of two subscribing witnesses.

EMIL LÜSCHER.
THEODOR LICHTENHAHN.

Witnesses:
ARMAND RILBY,
ARMAND HALLE.